(12) United States Patent
Binek et al.

(10) Patent No.: US 11,466,593 B2
(45) Date of Patent: Oct. 11, 2022

(54) DOUBLE WALLED STATOR HOUSING

(71) Applicant: United Technologies Corporation, Farmington, CT (US)

(72) Inventors: Lawrence A. Binek, Glastonbury, CT (US); Jesus A. Garcia, San Diego, CA (US); Faramarz M. Zarandi, Vernon, CT (US); Evan J. Butcher, Suffield, CT (US); Jesse R. Boyer, Middletown, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 143 days.

(21) Appl. No.: 16/736,392

(22) Filed: Jan. 7, 2020

(65) Prior Publication Data

US 2021/0207497 A1 Jul. 8, 2021

(51) Int. Cl.
| | |
|---|---|
| *F01D 25/26* | (2006.01) |
| *B33Y 80/00* | (2015.01) |
| *B33Y 10/00* | (2015.01) |
| *F02C 3/14* | (2006.01) |
| *F23R 3/60* | (2006.01) |

(52) U.S. Cl.
CPC .............. *F01D 25/26* (2013.01); *B33Y 80/00* (2014.12); *F05D 2240/14* (2013.01); *F05D 2250/221* (2013.01); *F05D 2250/283* (2013.01); *F05D 2260/22141* (2013.01)

(58) Field of Classification Search
CPC .......... F01D 25/26; F01D 25/24; F01D 9/023; B33Y 80/00; F05D 2240/14; F05D 2240/35; F05D 2250/221; F05D 2250/283; F05D 2260/22141; F23R 3/002; F23R 2900/03044; F23R 3/60; F23R 2900/00018; F02C 7/18; F23M 2900/05004; F23M 5/00
See application file for complete search history.

(56) References Cited

U.S. PATENT DOCUMENTS

| | | | |
|---|---|---|---|
| 3,600,890 A | 8/1971 | White et al. | |
| 4,503,668 A | 3/1985 | Duncan, III et al. | |
| 6,341,485 B1 * | 1/2002 | Liebe | F23R 3/002 60/800 |
| 7,651,317 B2 | 1/2010 | Charier et al. | |
| 9,080,447 B2 * | 7/2015 | McMahan | F23R 3/002 |
| 9,771,830 B2 | 9/2017 | Maar et al. | |
| (Continued) | | | |

FOREIGN PATENT DOCUMENTS

| | | |
|---|---|---|
| EP | 3379148 A1 | 9/2018 |
| WO | WO2018144064 A1 | 8/2018 |

OTHER PUBLICATIONS

Extended European Search Report for EP Application No. 21150537.5, dated May 31, 2021, pp. 8.

*Primary Examiner* — Eric J Zamora Alvarez
(74) *Attorney, Agent, or Firm* — Kinney & Lange, P.A.

(57) ABSTRACT

A double walled stator housing includes a first stator housing wall, a second stator housing wall located radially outward from the first stator housing wall, and an air gap located between the first and the second stator housing walls. The housing also includes at least one support structure attached to the first stator housing wall and the second stator housing wall, spanning the air gap and configured to minimize heat transfer between the first wall and the second wall.

11 Claims, 3 Drawing Sheets

(56) References Cited

U.S. PATENT DOCUMENTS

| | | |
|---|---|---|
| 2009/0053046 A1 | 2/2009 | Black et al. |
| 2016/0290647 A1 | 10/2016 | Propheter-Hinckley et al. |
| 2018/0156056 A1 | 6/2018 | Bonacum et al. |
| 2019/0271237 A1 | 9/2019 | Martin et al. |

* cited by examiner

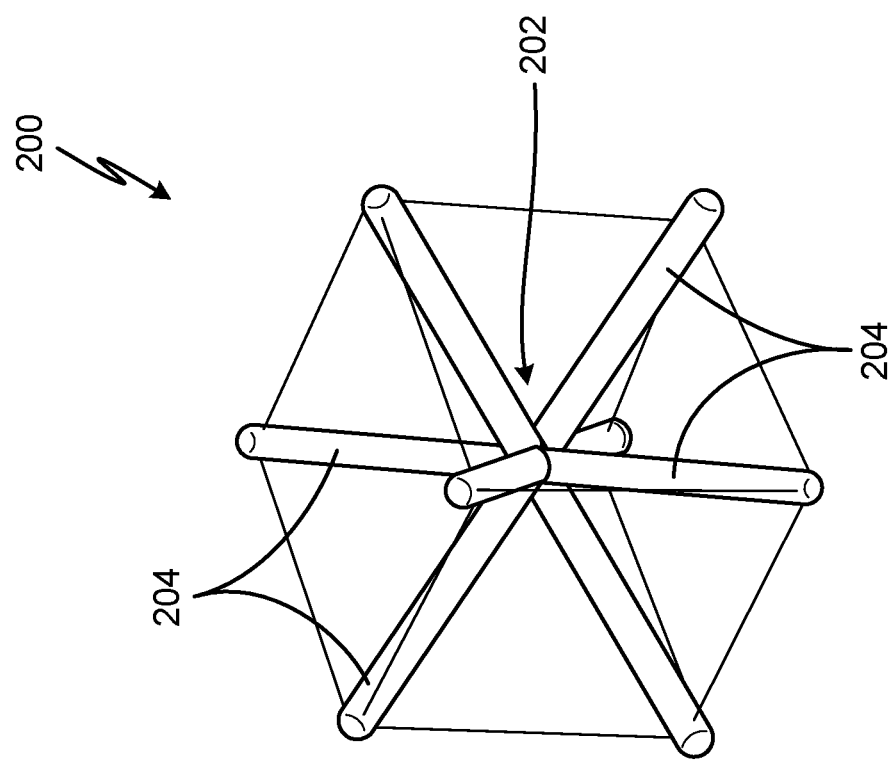

DOUBLE WALLED STATOR HOUSING

BACKGROUND

The present disclosure relates generally to attritable aircraft engines. More specifically, this disclosure relates to the housing of an attritable aircraft engine.

Attritable aircraft can include, for example, Unpiloted (or Unmanned) Aerial Vehicles (UAVs) and expendable turbojet systems for guided munitions, missiles, and decoys. Attritable aircraft are generally designed as limited lifetime vehicles, with expected lifetimes as short as a single use or single mission vehicle. As such, many components and features common in traditional piloted aircraft are unnecessary or can be simplified for attritable aircraft applications, such as the thermal blankets commonly included on traditional aircraft engines.

One of the main components of many simple gas turbine engines is a stator housing that encompasses a compressor, combustor, turbine, or a combination of these modules. As a result of the high gas temperatures and pressures generated by these modules, the stator housing functions as a pressure vessel and a thermal barrier to other components associated with the gas turbine engine. For example, external components mounted on a gas turbine engine can include those that contain or convey flammable fluids and the stator housing can operate above the auto-ignition temperatures of those flammable fluids. In the event of a leak or spill, the flammable fluids may combust, creating a safety critical fire hazard.

Conventionally, thermal blankets are installed on the external surfaces of the stator housing to keep the external surfaces of the gas turbine engine below the auto-ignition temperature of the flammable fluids, which is typically accepted as 450° F. (232° C.). However, thermal blankets add cost and weight to a gas turbine engine, are cumbersome to install, and are costly to maintain.

SUMMARY

A double walled stator housing includes a first stator housing wall, a second stator housing wall located radially outward from the first stator housing wall, and an air gap located between the first and the second stator housing walls. The housing also includes at least one support structure attached to the first stator housing wall and the second stator housing wall, spanning the air gap and configured to minimize heat transfer between the first wall and the second wall.

A method of manufacturing a double walled stator housing includes manufacturing a first stator housing wall and manufacturing a second stator housing wall located radially outward from the first stator housing wall and the second stator housing wall having an inlet and an outlet and the first and second stator housing walls define an air gap. The method also includes manufacturing at least one support structure attached to the first stator housing wall and the second stator housing wall, spanning the air gap and configured to minimize heat transfer between the first wall and the second wall.

BRIEF DESCRIPTION OF THE DRAWINGS

FIG. 3 is a perspective view of one embodiment of a repeating spar assembly.

DETAILED DESCRIPTION

An attritable engine with an integrally built double walled stator housing simplifies manufacturing. Even so, an attritable engine can leverage additive manufacturing techniques to improve various aspects of the limited-life engine. For example, additive manufacturing allows the assembly details to be unitized, and simultaneously permits integration of many complex performance-enhancing features. The use of additive manufacturing to produce the engine reduces the time to delivery to the customer and lowers the overall production costs of the unit.

Disclosed herein is an attritable engine with an integrally built double walled stator housing configured to maintain the temperature of the external surface of the double walled stator housing below the auto-ignition temperature of any flammable fluids, generally accepted as 450° F. (232° C.). Many gas turbine engine systems include thermal blankets, which are typically much less dense than metallic stator housings, but are applied at a thickness 5-10 times that of the metallic housing. On the whole, thermal blankets can add 10-50% of the weight of the stator housing they are insulating. Building a double walled stator housing obviates the need to provide such a thermal blanket on the exterior of the stator housing, eliminating the need for cumbersome installation, reducing overall system weight, and simplifying ongoing maintenance.

Figure 1:
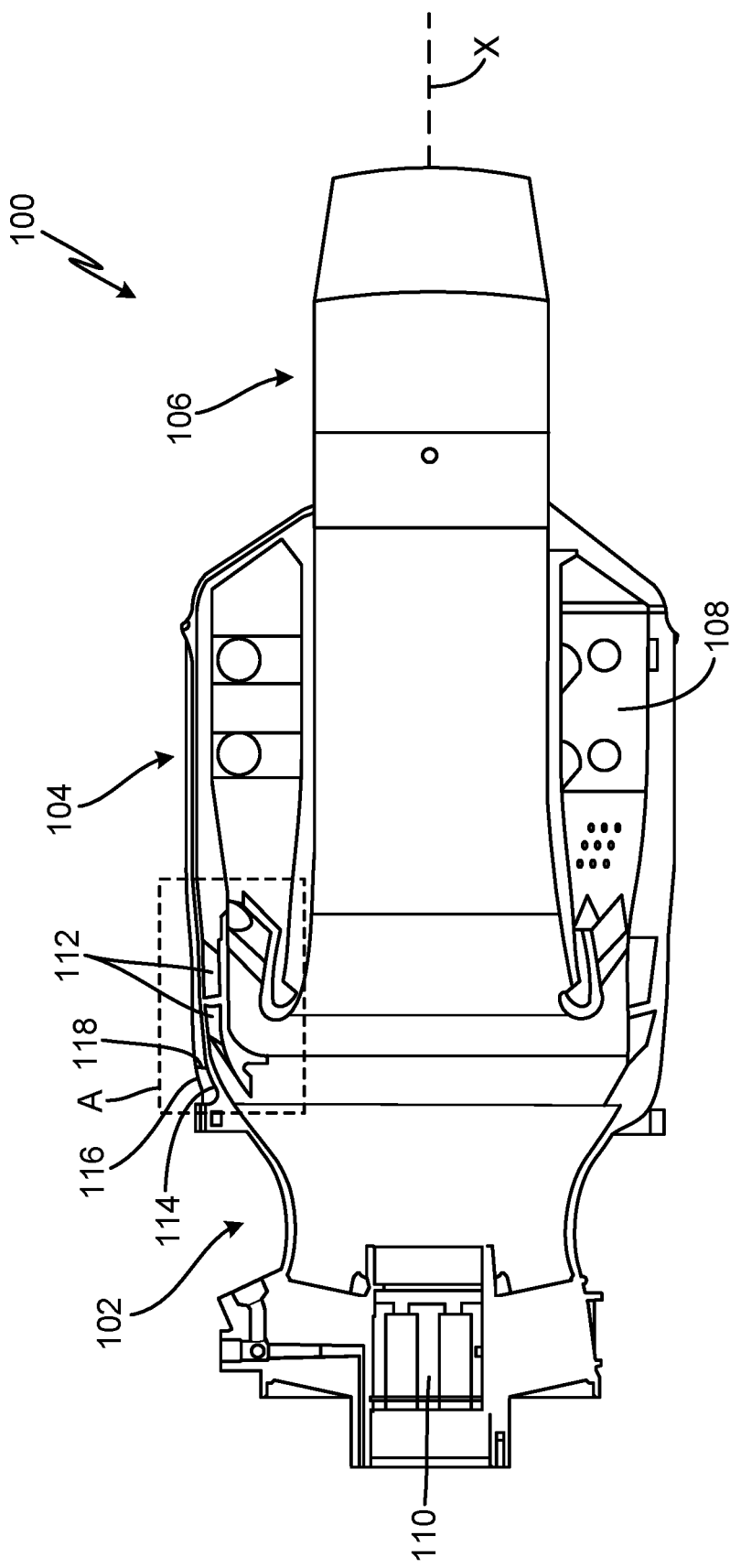
FIG. 1 is a cross-sectional view of an attritable engine.

FIG. 1 is a cross-sectional view of an attritable engine. FIG. 1 shows attritable engine 100 including compressor section 102, turbine section 104, exhaust section 106, combustor 108, rotor 110, stators 112, first stator housing wall 114, second stator housing wall 116, structural features 118, and axis of rotation X. In the illustrated embodiment, attritable engine 100 shows compressor section 102 lying forward and adjacent to turbine section 104, which is positioned forward of exhaust section 106. Although combustor 108 lies physically aft of turbine section 104, combustor 108 fluidically sits between compressor section 102 and turbine section 104. This arrangement may be referred to as a reverse flow combustor. Rotor 110 extends along the axis of rotation X into both compressor section 102 and turbine section 104.

Stators 112 are attached to first stator housing wall 114 and positioned in a compressed air flow path between compressor section 102 and combustor 108. Second stator housing wall 116 is located radially outward and spaced apart from first stator housing wall 114, separated by an air gap and coarsely distributed structural features 118.

Operationally, air enters the forward end of compressor section 102 and is compressed by compressor blades and vanes. Compressed air flows around stators 112 and is retained inside the compressed air flow path by first stator housing wall 114. Compressed air and fuel enter a combustor where the compressed air and fuel are mixed and ignited. The resulting high-temperature gas from the combustor enters a turbine section and drives the rotation of turbine blades, which in turn generates power by turning rotor 110 circumferentially about axis of rotation X. Gas exits the engine out of the aft end of an exhaust section.

Attritable engine 100 can be additively manufactured using techniques such as laser powder bed fusion, electron beam melting, direct energy deposition, and binder jetting. The additive manufacturing process can use any metal or alloy that can tolerate the high temperature and pressure environment of a gas turbine engine for the expected useable life of the vehicle, such as, for example, nickel based alloys like Inconel® 625 and ceramic based materials. However, guided munitions, missiles, and decoys are designed as single use vehicles and can have a maximum useable life of 10 hours. Heat protection that extends the useable life of the vehicle beyond 10 hours can unnecessarily add labor and expense to the manufacturing of such an engine. On the other hand, some UAVs can be designed to perform multiple missions and more heat protection may be desirable. A specific metal or alloy with or without additional treatments to provide heat protection can be chosen with such considerations in mind. For example, a thermal barrier layer or coating can be applied to the metal or alloy to extend the useful life of the attritable engine.

Figure 2:
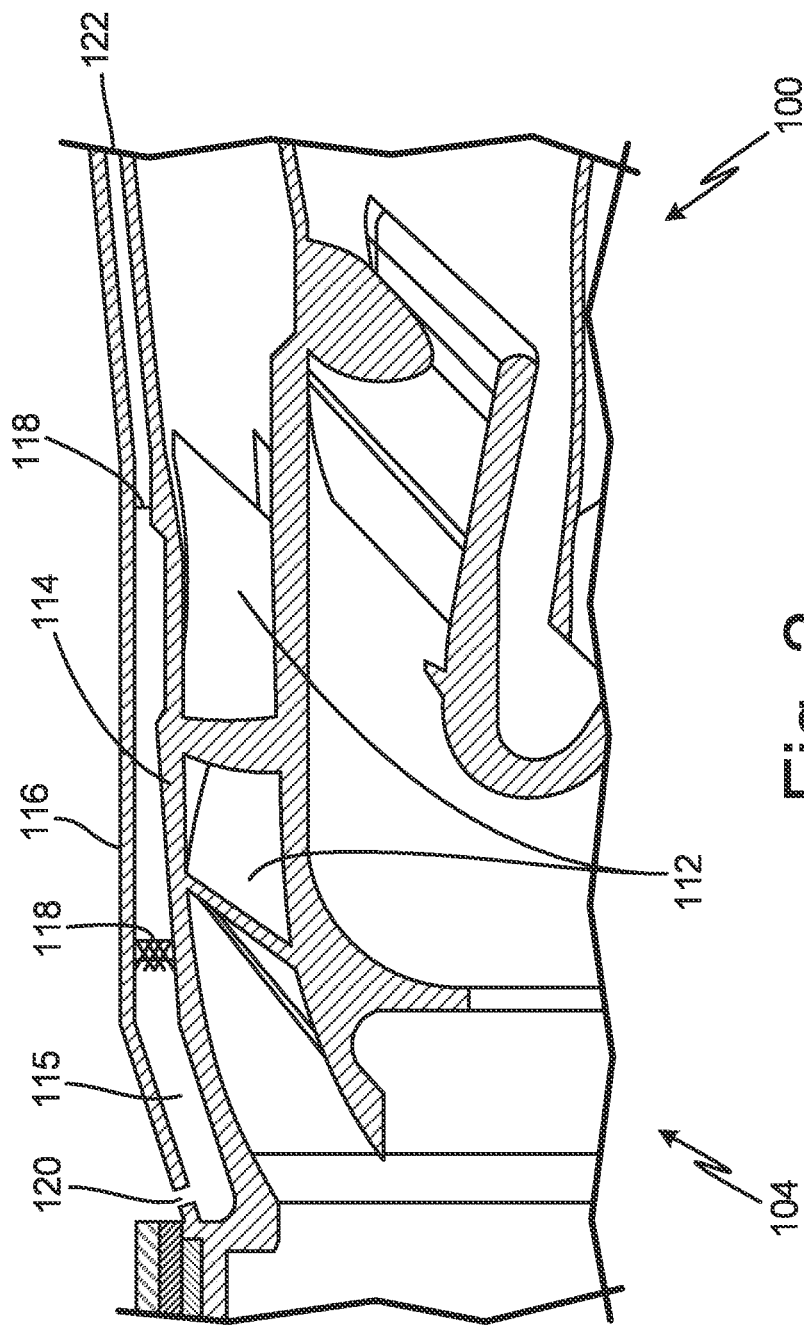
FIG. 2 is sectional view A of the cross-sectional view in FIG. 1.

FIG. 2 is sectional view A of the cross-sectional view in FIG. 1. FIG. 2 shows attritable engine 100 including turbine section 104, stators 112, first stator housing wall 114, air gap 115, second stator housing wall 116, structural features 118, second stator housing wall inlet 120, and second stator housing wall outlet 122. Stators 112 are attached to first stator housing wall 114 and positioned in a compressed air flow path between the compressor section and the combustor. Second stator housing wall 116 is located radially outward and spaced apart from first stator housing wall 114, defining air gap 115.

Second stator housing wall 116 can also include second stator housing wall inlet 120 and second stator housing wall outlet 122. Ambient air can enter second stator housing wall inlet 120 and flow through air gap 115 and exit second stator housing wall outlet 122. Ambient air cools first and second stator housing walls 114, 116 and structural features 118 as it travels through air gap 115 and helps to prevent the exterior surface of second stator housing wall 116 from reaching a temperature of 450° F. (232° C.) or above.

Structural features 118 are coarsely distributed within air gap 115 and attached to first and second stator housing walls 114, 116. In other words, structural features 118 are distributed within air gap to provide structural support to maintain air gap 115 and the overall structural integrity of the double wall construction. For example, neither the first nor the second stator housing wall 114, 116 bend, warp, crack, or move relative to one another during operation of the engine. However, the size, shape, and number of structural features 118 are minimized to limit the amount of heat transfer between first and second stator housing walls 114, 116 by conduction means. As such, structural features 118 are not present throughout the entirety of air gap 115.

Structural features 118 are sized and shaped to provide structural support to the double wall construction of the stator housing and to minimize heat transfer between the walls. For example, structural features 118 can be a snub, point, or rib and have a spire or hourglass shape. In one embodiment, structural features 118 are a plurality of lattice networks. As depicted in FIG. 2, structural features 118 are located in two discrete axial locations within air gap 115. In some embodiments, structural features 118 are located in more than two discrete axial locations within air gap 115. Furthermore, structural features 118 may continuously and circumferentially extend all the way around attritable engine 100 or structural features 118 may have one or more gaps interspersed circumferentially around attritable engine 100.

Structural features 118 can be any number, size, shape, or distribution pattern within air gap 115. Considerations such as, for example, the size of the engine, the thickness of the stator housing walls, the size of the air gap, the amount of cooling necessary to maintain an external temperature of the second stator housing wall below the auto-ignition temperature of any flammable liquids housed or transported adjacent to the second stator housing wall are used to determine the smallest structural feature footprint to minimize heat transfer between the stator housing walls. Such considerations also minimize added weight to the attritable engine, but still provide sufficient structural support such that neither the first nor the second stator housing wall bend, warp, crack, or move relative to one another during operation of the engine.

FIG. 3 is a perspective view of one embodiment of a repeating spar assembly. FIG. 3 shows spar assembly 200 including center point 202 and spars 204. In the illustrated embodiment, there are eight spars 204 radially extending from center point 202. Adjacent spars 204 lie at substantially 90° angles to one another. The ends of any four adjacent spars 204 can form an abstract square. Taking all six sets of four adjacent spars 204 and the resulting abstract square from each set of four adjacent spars 204 forms an abstract 3-dimensional shape, which can referred to as a cube. A plurality of spar assemblies can be repeatedly attached to one another to form a lattice network.

Each spar 204 can have, for example, a diameter of 0.01 inches (0.25 mm). In other embodiments, each spar 204 can have a diameter from 0.005 inches (0.13 mm) to 0.02 inches (0.51 mm), inclusive. In other embodiments, each spar 204 can have a diameter smaller than 0.005 inches (0.13 mm). In other embodiments, each spar 204 can have a diameter larger than 0.02 inches (0.51 mm). Each spar 204 can have a length of 0.05 inches (1.3 mm). In other embodiments, each spar 204 can have a length from 0.03 inches (0.76 mm) to 0.1 inches (2.5 mm), inclusive. In other embodiments, each spar 204 can have a length smaller than 0.03 inches (0.76 mm). In other embodiments, each spar 204 can have a length larger than 0.1 inches (2.5 mm).

In other embodiments, spar assembly 202 includes more than eight spars 204. In other embodiments, spar assembly 204 includes fewer than eight spars 204. In other embodiments, two adjacent spars 204 can lie at an angle more than 90° from one another. In other embodiments, two adjacent spars 204 can lie at an angle from 45° to 90° from one another.

An attritable engine with an integrally built double walled stator housing simplifies manufacturing. Additively manufacturing the attritable engine allows the assembly details to be unitized and simultaneously permits integration of many complex performance-enhancing features. For example, the integrally built double walled stator housing is configured to maintain the temperature of the external surface of the double walled stator housing below the auto-ignition temperature of any flammable fluids located near the external surface. This obviates the need to provide a thermal blanket on the exterior of the stator housing. As such, the added weight, the cumbersome installation, and the ongoing maintenance costs due to the thermal blanket are eliminated.

Discussion of Possible Embodiments

The following are non-exclusive descriptions of possible embodiments of the present invention.

A double walled stator housing includes a first stator housing wall, a second stator housing wall located radially outward from the first stator housing wall, and an air gap located between the first and the second stator housing walls. The housing also includes at least one support structure attached to the first stator housing wall and the second stator housing wall, spanning the air gap and configured to minimize heat transfer between the first wall and the second wall.

The double walled stator housing of the preceding paragraph can optionally include, additionally and/or alternatively, any one or more of the following features, configurations and/or additional components:

The second stator housing includes an inlet and an outlet.

The first stator housing wall, the second stator housing wall, the air gap, and the at least one support structure work together to maintain an external temperature of the second stator housing wall at or below 450° F. (232° C.) during operation of the engine.

The at least one support structure are two support structures axially spaced apart from one another.

The at least one support structure is a snub and has an hourglass shape.

The at least one support structure is a rib.

The at least one support structure is a lattice network.

The lattice network is formed of a repeating network of spar assemblies.

Each spar assembly has a cubic shape.

Each spar has a diameter from 0.005 inches (0.13 mm) to 0.02 inches (0.51 mm), inclusive.

Each spar has a length from 0.03 inches (0.76 mm) to 0.1 inches (2.5 mm), inclusive.

The at least one support structure is integral and conformal with the first and second stator housing walls.

A method of manufacturing a double walled stator housing includes manufacturing a first stator housing wall and manufacturing a second stator housing wall located radially outward from the first stator housing wall and the second stator housing wall having an inlet and an outlet and the first and second stator housing walls define an air gap. The method also includes manufacturing at least one support structure attached to the first stator housing wall and the second stator housing wall, spanning the air gap and configured to minimize heat transfer between the first wall and the second wall.

The method of the preceding paragraph can optionally include, additionally and/or alternatively, any one or more of the following features, configurations and/or additional components:

The at least one support structure are two support structures axially spaced apart from one another.

The at least one support structure is a snub and has an hourglass shape or is a rib.

The at least one support structure is a lattice network and the lattice network is formed of a repeating network of spar assemblies.

Each spar assembly has a cubic shape.

Each spar has a diameter from 0.005 inches (0.13 mm) to 0.02 inches (0.51 mm), inclusive.

Each spar has a length from 0.03 inches (0.76 mm) to 0.1 inches (2.5 mm), inclusive.

The manufacturing is performed using additive manufacturing techniques.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A double walled stator housing, the double walled stator housing comprising:
    a first stator housing wall;
    a second stator housing wall located radially outward from the first stator housing wall;
    an air gap located between the first and the second stator housing walls; and
    a plurality of support structures attached to the first stator housing wall and the second stator housing wall, spanning the air gap and configured to minimize heat transfer between the first stator housing wall and the second stator housing wall;
    wherein the plurality of support structures comprises a lattice network formed of a repeating network of spar assemblies, each spar assembly comprising a plurality of spars radially extending from a center point of the spar assembly such that each spar extends from the center point to an external spar end, and each spar assembly forming a cubic shape defined by each external spar end.

2. The double walled stator housing of claim 1, wherein the first stator housing wall, the second stator housing wall, the air gap, and the plurality of support structures work together to maintain an external temperature of the second stator housing wall at or below 450° F. (232° C.) during operation of an engine.

3. The double walled stator housing of claim 1, wherein the plurality of support structures comprises two support structures axially spaced apart from one another.

4. The double walled stator housing of claim 1, wherein each spar of each spar assembly has a diameter from 0.005 inches (0.13 mm) to 0.02 inches (0.51 mm), inclusive.

5. The double walled stator housing of claim 1, wherein each spar of each spar assembly has a length from 0.03 inches (0.76 mm) to 0.1 inches (2.5 mm), inclusive.

6. The double walled stator housing of claim 1, wherein each support structure of the plurality of support structures is integral and conformal with the first and second stator housing walls.

7. A method of manufacturing a double walled stator housing, the method comprising:
    manufacturing a first stator housing wall;
    manufacturing a second stator housing wall located radially outward from the first stator housing wall, wherein the first stator housing wall and the second stator housing wall define an air gap; and
    manufacturing a plurality of support structures attached to the first stator housing wall and the second stator housing wall, spanning the air gap and configured to minimize heat transfer between the first stator housing wall and the second stator housing wall;
    wherein the plurality of support structures comprises a lattice network formed of a repeating network of spar assemblies, each spar assembly comprising a plurality of spars radially extending from a center point of the spar assembly such that each spar extends from the center point to an external spar end, and each spar assembly forming a cubic shape defined by each external spar end.

8. The method of claim 7, wherein the plurality of support structures comprises two support structures axially spaced apart from one another.

9. The method of claim 7, wherein each spar of each spar assembly has a diameter from 0.005 inches (0.13 mm) to 0.02 inches (0.51 mm), inclusive.

10. The method of claim 7, wherein each spar of each spar assembly has a length from 0.03 inches (0.76 mm) to 0.1 inches (2.5 mm), inclusive.

11. The method of claim 7, wherein the manufacturing is performed using additive manufacturing.

\* \* \* \* \*